United States Patent [19]

Crews, IV et al.

[11] Patent Number: 5,672,390

[45] Date of Patent: *Sep. 30, 1997

[54] PROCESS FOR PROTECTING A SURFACE USING SILICATE COMPOUNDS

[75] Inventors: Nathan C. Crews, IV, Bremerton; Daniel A. Young; Lance A. Young, both of Port Orchard, all of Wash.

[73] Assignee: Dancor, Inc., Newport Beach, Calif.

[*] Notice: The term of this patent shall not extend beyond the expiration date of Pat. No. 5,205,874.

[21] Appl. No.: 407,316

[22] Filed: Mar. 20, 1995

Related U.S. Application Data

[63] Continuation of Ser. No. 979,155, Nov. 20, 1992, abandoned, which is a continuation-in-part of Ser. No. 704,125, May 22, 1991, Pat. No. 5,205,874, which is a continuation-in-part of Ser. No. 611,140, Nov. 13, 1990, abandoned.

[51] Int. Cl.$^6$ ................ B05D 3/04; C23C 22/78
[52] U.S. Cl. ............ 427/307; 427/337; 427/325; 427/327; 427/344; 427/397.8; 148/254; 148/256
[58] Field of Search ................ 427/307, 325, 427/327, 344, 397.8, 337; 148/254, 256

[56] References Cited

U.S. PATENT DOCUMENTS

| | | |
|---|---|---|
| 2,952,562 | 9/1960 | Morris et al. . |
| 2,998,328 | 8/1961 | Munger et al. . |
| 3,306,765 | 2/1967 | DuFresne et al. . |
| 3,423,229 | 1/1969 | Kompaneck, Jr. et al. . |
| 3,658,662 | 4/1972 | Casson, Jr. et al. . |
| 3,775,266 | 11/1973 | Ikeda et al. . |
| 3,989,550 | 11/1976 | Newhard . |
| 4,120,702 | 10/1978 | Akerblom . |
| 4,150,191 | 4/1979 | Karki . |
| 4,492,616 | 1/1985 | Pliefke et al. . |
| 4,647,479 | 3/1987 | Montes . |
| 4,661,334 | 4/1987 | Latourrette et al. . |
| 4,689,272 | 8/1987 | Simon et al. . |
| 4,710,309 | 12/1987 | Miller . |
| 4,746,555 | 5/1988 | Luckanuck . |
| 4,758,281 | 7/1988 | Eckler et al. . |
| 4,793,903 | 12/1988 | Holmquist et al. . |
| 4,810,741 | 3/1989 | Kim . |
| 4,908,075 | 3/1990 | Yamasoe . |
| 5,205,874 | 4/1993 | Crews, IV et al. . |

FOREIGN PATENT DOCUMENTS

| | | | |
|---|---|---|---|
| 82476 | 5/1982 | Japan | 148/275 |
| 106397 | 6/1983 | Japan | 148/275 |
| 181295 | 9/1985 | Japan | 148/275 |

OTHER PUBLICATIONS

Patent Abstracts of Japan, vol. 13, No. 579 (C–668), Dec. 20, 1989 and JP–A–01 240674 (Kobe Steel Ltd.), Sep. 26, 1989.

*Primary Examiner*—Shrive Beck
*Assistant Examiner*—Brian K. Talbot
*Attorney, Agent, or Firm*—Knobbe, Martens, Olson & Bear LLP

[57] ABSTRACT

A process for forming a protective layer on a rigid surface, such as a metal or wood surface, to provide protection against abrasion, corrosion, heat and fire. The process comprises first preparing the surface of the article. On metal articles, the surface can be prepared by cleaning the surface and then exposing the surface to concentrated phosphoric acid. On wood, the surface can be prepared by thoroughly cleaning the surface with hot water and detergent only. Preferably, the surface is prepared such that a uniform, continuous layer of liquid can be formed thereon. After the surface is prepared, a 10–16% (v/v) silicate-containing solution is then applied for 20 seconds and allowed to dry completely at 305° F. to form a layer of silicate material over the surface. During the drying process, at least a portion of the sodium silicate is converted into silicon dioxide. An acid is then applied to the surface to form the protective layer on the surface.

27 Claims, 3 Drawing Sheets

5,672,390

PROCESS FOR PROTECTING A SURFACE USING SILICATE COMPOUNDS

This application is a continuation of U.S. patent application Ser. No. 07/979,155, filed on Nov. 20, 1992, now abandoned which is a continuation-in-part of U.S. patent application, Ser. No. 07/704,125, filed May 22, 1991, entitled "PROCESS OF PROTECTING METALLIC OR WOOD SURFACES USING SILICATE COMPOUNDS", inventors Nathan C. Crews et al, now U.S. Pat. No. 5,205,874, which is a continuation-in-part of a U.S. patent application, Ser. No. 07/611,140, filed Nov. 13, 1990, now abandoned.

FIELD OF THE INVENTION

The present invention relates to a method for forming a a protective layer on a rigid surface of an article. The protective layer is formed by applying a layer of a silicate-containing solution to the rigid surface, drying the layer, and applying an acidic solution to the dried layer in order to form the protective layer.

BACKGROUND OF THE INVENTION

The destruction of metallic and wood articles, such as through abrasion and corrosion, has a substantial economic impact on many industries. Inhibiting such destructive forces is therefore of substantial commercial and practical value. One method for inhibiting abrasion and corrosion is the use of a protective barrier or coating over an article's exposed surfaces.

Various types of protective barriers have been used. For example, organic compositions, such as paints, varnishes, lacquers, and the like can be applied directly over the surface of the article. In order to act as a protective barrier, the organic composition must be compatible with the treated surface. Also, with some organic compositions the surface must be pre-treated before application so that proper bonding and adhesion occurs to the surface. When applying paints to an aluminum or aluminum alloy surface, for example, the surface must be thoroughly cleaned and "roughed-up" or "pickled" so that the paint adheres to the surface. When relatively thin paints are used, however, the "roughed-up" or "pickled" underlying surface may be seen through the paint layer, which may be undesirable. The protective barrier formed by some organic compositions may also be relatively soft and not resistant to abrasions or corrosion.

Another type of protective barrier uses silicate compounds which are chemically bonded to various metallic surfaces. It is widely known that various silicate compounds can be used to form hard, smooth surfaces that are resistant to abrasion and corrosion. U.S. Pat. No. 3,658,662 to Casson, et al. discloses lithographic plates made of aluminum or aluminum alloy material that are silicated to provide a hard, smooth barrier between the plate's surface and the corrosive diazonium salts and other photosensitive coatings used in the lithographic process. Another advantage of silicate compounds is their heat and fire resistant properties. U.S. Pat. No. 4,810,741 to Kim, for example, discloses an elaborate process for producing a fire-resistant, non-combustible material containing silicate compounds. However, such silicated materials still allow unacceptably high levels of corrosion, and are prone to be dissolved by solvents.

One type of coating which uses silicate compounds is applied using electrolytic processes, such as that disclosed in U.S. Pat. No. 3,658,662 to Casson, et al. This process involves the use of a basic electrolyte solution of sodium silicate or other salts and a piece of aluminum which acts as an anode. Electricity is supplied between the aluminum anode and a cathode in order to cause an aluminum silicate barrier to form on the surface of the aluminum anode. This process, however, cannot be used on surfaces which do not conduct electricity, such as wood.

Some prior art protective coatings, particularly coatings for metals, also contain toxic substances, such as chromates and cadmium. Such substances are both harmful to the environment and expensive to dispose of. The processes for creating such coatings, such as the widely used chromate conversion coating, also create other waste disposal problems. The coatings created by such processes, moreover, lack great resistance to abrasion. There is therefore a great need for an improved protective coating for metals and other materials that does not use substances that are toxic or otherwise harmful to the environment and that confers greater resistance to abrasion.

SUMMARY

In contrast to prior art protective coatings, the protective layer formed by the method of the present invention provides a coating for a relatively rigid surface of an article that is highly resistant to abrasion, corrosion, solvents, fire, and other destructive forces. This protective layer is formed from non-toxic materials by a process which itself does not generate further hazardous waste. The present invention therefore represents a significant improvement in the art of protective layers for coatings for rigid surfaces.

In one embodiment, a method for treating a rigid surface of an article in order to form a protective layer on that rigid surface is disclosed which comprises the steps of:

(a) forming a hydrophilic surface on the rigid surface of the article;

(b) applying a silicate-containing solution to the hydrophilic surface, thereby forming a continuous layer of the silicate-containing solution on the hydrophilic surface;

(c) drying the layer of silicate-containing solution on the hydrophilic surface to produce a dried layer of silicate material on the rigid surface of the article; and (d) exposing the dried layer of silicate material to an acid, thereby forming the protective layer on the rigid surface.

In this method, the hydrophilic surface can be created by any of various means, including chemical means and mechanical means, such as sanding the surface. The hydrophilic surface can also be rinsed before it is exposed to the silicate-containing solution.

In this method, the silicate-containing solution contains between 10% and 100% (by volume) of a silicate compound. Preferably, the silicate-containing solution contains between 20% and 40% (by volume) of the silicate compound. The silicate-containing solution is also preferably a sodium silicate solution, although the silicate-containing solution can as well be a potassium silicate solution. When the hydrophilic surface is exposed to the silicate-containing solution, it can be exposed for between 1 and 60 seconds in order to form the layer of silicate-containing solution. Preferably, however, the hydrophilic surface is exposed to the silicate-containing solution for 20 seconds or less The drying step of the present method preferably comprises heating the layer of silicate-containing solution on the hydrophilic surface. The layer of silicate-containing solution should be heated to at least 302° F. In this method, the heating step can comprise exposing the layer of silicate-containing solution on the hydrophilic surface to an environment having an initial temperature of between about 68° F. and 480° F. and then raising the temperature of the environment at a rate of between about 30° F. and 60° F. per minute until a temperature of between 302° F. and 480° F. is reached. Preferably, this step comprises exposing the layer of silicate-containing solution on the hydrophilic surface to the environment having an initial temperature of between 120° F. and 150° F. and then raising the temperature of the environment at a rate of between about 30° F. and 60° F. per minute until a temperature of between 305° F. and 350° F. is reached. The entire drying step lasts for between about 2 minutes and 50 minutes, and preferably for between 6 minutes and 15 minutes.

The acid used in the present method can be an acidic solution which contains between 1% and 99% by volume of an acid, although the acidic solution preferably contains between 10% and 30% by volume of the acid. The acid can be phosphoric acid, which is inexpensive and readily available. The dried layer of silicate material is exposed to the acidic solution for between about 5 seconds and 120 seconds, and preferably for between 20 seconds and 50 seconds. In this embodiment, acidic solution can be between 68° F. and 180° F. when the dried layer of silicate material is exposed to the acidic solution.

In one embodiment, steps (b) to (d) above are repeated a plurality of times in order to provide improved corrosion resistance and other characteristics. In this and other embodiments, the protective layer is rinsed to remove excess acid.

Another embodiment of the present invention comprises an article having a rigid surface on which a protective layer has been formed, the protective layer being formed by:

(a) forming a hydrophilic surface on the rigid surface of the article;

(b) applying a silicate-containing solution to the hydrophilic surface, thereby forming a continuous layer of the silicate-containing solution on the hydrophilic surface;

(c) drying the layer silicate-containing solution on the hydrophilic surface to produce a dried layer of silicate material on the rigid surface of the article; and (d) exposing the dried layer of silicate material to an acid, thereby forming the protective layer on the rigid surface.

In another, alternative embodiment of the present invention, a method for treating an article having a rigid surface in order to form a protective layer on the rigid surface is provided which comprises the steps of:

(a) applying a uniform layer of a silicate-containing solution to the rigid surface of the article;

(b) drying the uniform layer of the silicate-containing solution to produce a dried layer of silicate material on the rigid surface; and (c) exposing the solid layer of silicate material to an acid, thereby forming a protective layer on the rigid surface.

This method can additionally comprise the step of providing a hydrophilic surface on the rigid surface before applying the uniform layer of the silicate-containing solution to the rigid surface.

In yet another embodiment of the present invention, a protective layer on a rigid surface is disclosed, the protective layer comprising:

an outer layer comprising silicon dioxide, the outer layer being non-porous; and an inner layer comprising silicon dioxide and a metal oxide, the inner layer being water-soluble. These and other aspects and embodiments of the present invention will be discussed in further detail below.

DETAILED DESCRIPTION OF THE INVENTION

Figure 1:
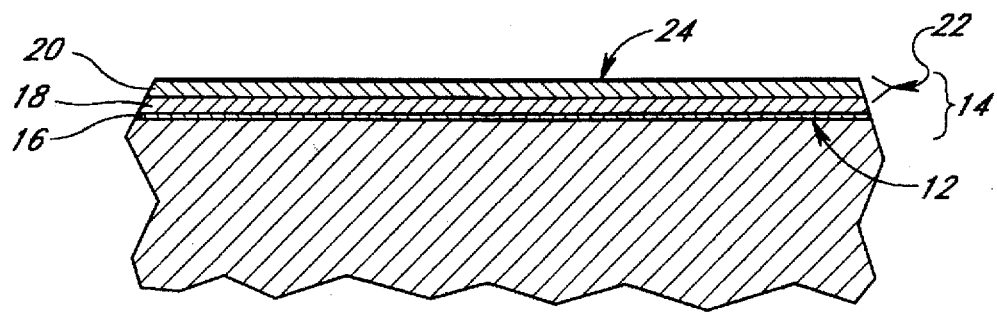
FIG. 1 is a cross-sectional view of a metallic article having a protective layer formed thereon comprising one inner layer of silicate salt and an outer bi-layer.

The present invention comprises an improved method of treating a rigid surface of an article in order to create a protective layer on that surface. It is believed that the surface of any relatively rigid material, such as a metal, can be treated according to the present method in order to protect the surface of that material. The protective layer created by the present method is believed to contain substantial amounts of silicon dioxide, and has been found to be substantially resistant to most chemical solvents.

The protective layer created by the inventive method can be used to facilitate paint adhesion to a surface, as well as to impart a glossy finish to such a surface. The protective layer, however, has been found to be especially useful in protecting surfaces from environmental damage such as corrosion and abrasion. In particular, the protective layer created by the present method has been found to be of great use in protecting metal surfaces from corrosion. For example, aluminum and steel surfaces treated according to the present method have been substantially protected from corrosion. Treated aluminum and steel surfaces were subjected to ASTM-B117 Accelerated Salt Spray Corrosion Tests and to paint adhesion tests per Mil. Specification C-5541, with various exposure durations. Aluminum alloys were subjected to such tests for 168 and 336 hours, and were found to meet and exceed the standards specified for aluminum alloys subjected to these tests. Steel and zinc-coated steel alloys were also subjected to such tests for 1.5, 2, 4, 12, 24, 48, and 96 hours, and were likewise found to meet and exceed the standards set for such alloys.

In one embodiment, the process disclosed herein forms a protective layer comprising an outer layer of silicon dioxide over one or more inner layers of silicate salt. To form such a protective layer, the process begins by creating a fixed surface on an article, such as metallic or wood article. The fixed surface is created by first washing the surface with detergent and hot water. With metallic articles, the surface is then exposed to a fixing acid solution which etches or chemically reacts with the surface to form a thin film layer thereon. The film layer contains binding substances, such as metallic oxide material, which enables the layer of silicate salt formed in the next step to bind to the surface. In one aspect of this embodiment, the fixing acid is phosphoric acid, which forms a thin film layer comprising metallic oxide and metallic ortho-phosphate material. After exposing the surface on the metallic article to the acid, excess acid, oxides, or other impurities not tightly bonded to the surface are then forcibly removed by wiping the surface with a cloth or by washing the surface with pressurized hot water. With wood articles, no further steps are needed to create a fixed surface.

After a fixed surface is created on the article, it is then exposed to an alkali or alkaline-earth metal silicate solution. Although various types of silicate solutions may be used in the process, in the preferred process the fixed surface is exposed to 18–33% (v/v) sodium silicate solution. After exposure, the fixed surface is dried completely, preferably a temperature of 302° F. or more, to form a thin layer of silicate salt over the fixed surface. During the drying step, it is postulated that a portion of the silicate salt is converted into silicon dioxide. With wood surfaces, it is postulated that during this first exposure, the silicate salt solution is partially absorbed into the wood fibers located along the surface. The amount of silicate salt solution absorbed is dependent upon the type of wood, the porosity of the wood, and the length of exposure.

Because cracks and other imperfections can occur in the first layer of silicate salt during the process, the entire process may be repeated to form a plurality of layers of silicate salt over the lower layers of silicate salt. Each layer of silicate salt provides greater protection to the article against abrasion, corrosion, fire and heat. After the final layer of silicate salt is formed and dried, it is then exposed to a strong acid, such as an acidic solution. During this exposure, the final layer of silicate salt is transformed into an outer bi-layer structure comprising an inner layer of silicate salt and an outer layer of silicon dioxide. When the entire process is completed, the protective layer comprises a plurality of inner layers of silicate salt at least partially converted into silicon dioxide and an outer bi-layer comprising an inner layer of silicate salt and an outer layer of silicon dioxide.

The above stated process may be further modified by exposing each dried layer of silicate salt to an acid before forming a subsequent layer of silicate salt thereover. This creates a plurality of bi-layers, similar to the outer bi-layer described above, over the fixed surface which improves the protective layers resistance to abrasion, corrosion, fire and heat. When using this alternative process, each layer of silicate salt is transformed into an inner bi-layer comprising a layer of silicate salt and an outer layer of silicon dioxide. For most applications, one inner bi-layer is formed under the outer bi-layer to provide sufficient protection. When the entire process is completed, a protective layer is formed over the metallic or wood article to protect it against abrasion, corrosion, heat, and fire.

In one embodiment, the present method can be used to protect metallic and wood surfaces. As used herein, the term "metallic" refers to surfaces containing metal and metal alloys, including steel, aluminum, and associated alloys. Also as used herein, the term "wood" refers to all types of woods or wood products. It is anticipated that this embodiment of the present method may also be used on articles made of other materials.

As shown in FIG. 1, the method disclosed herein can be used to form a protective layer 14 on a fixed surface 12 of an article 10, such as a metallic article. The protective layer 14 is thought to comprise an outer bi-layer structure 22 covering an inner layer of silicate salt material 18. When treating metallic articles according to this embodiment of the present method, a fixed surface 12 is created on the article 10. However, the creation of a fixed surface in the present method is optional. To create a fixed surface, the surface to be treated is first cleaned and dried. Although no particular method of cleaning and drying is preferred, warm water and a detergent have proven to be satisfactory. Next, the surface is exposed to a fixing acid solution which etches or chemically reacts with the surface to form a thin film layer 16 thereon. The thin film layer 16 preferably contains a binding substance, such as a metallic oxide material, which enables the layer of silicate salt formed later to bind to the surface. In one aspect of this embodiment, the fixing acid solution is 20% to 25% phosphoric acid and is left on the surface for 3 to 10 minutes. When phosphoric acid is used as the fixing acid solution, it is postulated that it etches and chemically reacts with the surface to form a thin film layer 16 comprising metal ortho-phosphate and a metal oxide salt. When acids stronger than phosphoric acid, such as hydrochloric acid, are used on metallic surfaces, excessive oxidation of the surface may occur.

Although any method may be used to expose the surface to be treated to a fixing acid solution, one method is to completely submerge the article 10 in an acid bath comprising the fixing acid solution. Preferably, the acid bath is heated to 120° F.–140° F. to speed up the reaction and to generate a more uniform appearance on the surface. For higher or lower concentrations of acid solution, however, the reaction times and temperatures may be decreased or increased accordingly.

After the film layer 16 is formed on the metallic surface, the surface is then wiped with a cloth or washed in warm water to forcibly remove any excess acid or any impurities. The impurities, generally referred to as smut material, comprise various oxides and phosphate salts (typically copper and magnesium salts) which form on the surface. This washing step, called desmutting, is conducted for appearance value only, since the smut material does not appear to hinder the creation of or the functioning of the protective layer. In the preferred process, desmutting is conducted by washing the film layer 16 with warm or hot water, 120° F.–140° F. Pressure and scrubbing action as well as other desmutting methods may also be used. The smut material is apparent by a dark grey to black color on aluminum alloys. After cleaning and rinsing, the film layer 16 is then dried.

Next, the film layer 16 is exposed to an alkali-metal or alkaline-earth metal silicate solution to form the inner layer of silicate salt over the fixed surface 12. The alkali-metal silicate solution can be selected from the group consisting of potassium silicate, sodium silicate, and lithium silicate. The alkaline-earth metal silicate solution can be selected from the group consisting of beryllium silicate, magnesium silicate, and calcium silicate. In a preferred embodiment, the film layer 16 is exposed to 18–33% (v/v) sodium silicate solution by immersion or spraying. When used on metallic articles 10, it is postulated that during the exposure to the sodium silicate solution, the metallic ortho-phosphate or metallic oxide material found in the film layer 16 chemically bonds with the sodium silicate in the solution to form the inner layer of silicate salt 18. The actual exposure time to the silicate solution can vary from about 1 to 10 minutes, depending upon the type of article and surface being treated. With smooth surfaces, for example, shorter exposure time is required than with rough or pitted surfaces. Also, some materials require longer exposure times than others. For example, surfaces made of aluminum or aluminum alloys require a shorter exposure time than magnesium or magnesium alloy surfaces.

After exposing the film layer 16 to the solution of sodium silicate, the layer of silicate salt 18 is then allowed to dry completely at a sufficiently high temperature. It is important that the film layer 16 be dried completely before proceeding to the next step in the process. In a preferred embodiment, the drying step is carried out in an oven at 302° F. or more. At this temperature, complete drying takes between about 2 and 30 minutes. It has been discovered that when sodium silicate is dried at 302° F. or more, a portion of it is converted into silicon dioxide, which appears to increase the resistance of the inner layer 18 to abrasion and corrosion. By increasing or decreasing the temperature or the drying time, the amount of conversion of sodium silicate into silicon dioxide can be increased or decreased, respectively, to create layers having different abrasion and corrosion-resistant properties.

After the inner layer 18 has dried completely, it is then preferably exposed again to the 18–33% (v/v) sodium silicate solution for about one to three minutes and then dried in the same manner as above to form a second layer of silicate salt 20 over the first inner layer 18. Unlike the first exposure to the sodium silicate solution used to create the inner layer 18, the length of exposure to the sodium silicate solution to form the second layer 20 is not as critical. Again, by controlling the drying temperature and the drying time, the amount of sodium silicate converted into silicon dioxide may be selectively controlled.

After the second layer 20 has dried completely, it is then preferably exposed to an acid, such as an acidic solution selected from the group consisting of acetic acid, boric acid, carbonic acid, hydrochloric acid, nitric acid, phosphoric acid, and sulfuric acid. During this exposure, the second layer 20 is converted into a uniform bi-layer 22. Bi-layer 22 comprises the lower portion of the second layer 20 and an outer layer of silicon dioxide 24. During the exposure to the acid solution, the acid chemically reacts with the silicate material in the second layer 20 to form the outer layer of silicon dioxide 24. In the preferred process, the second layer 20 is exposed to 20–25% (v/v) phosphoric acid heated between 120° F.–140° F. When the acid is heated to this temperature, the exposure time is between about 15 and 30 seconds. For aluminum, if the temperature of the acid is room temperature (about 68° F. to 140° F.), the exposure time should be between about two and seven minutes. Following this exposure, the outer layer of silicon dioxide 24 will be hard and smooth and have a uniform appearance. Because it is harder than sodium silicate, the protective layer 14 formed with the bi-layer structure 22 is more resistant to abrasion and corrosion than the single layers of sodium silicate.

Figure 2:
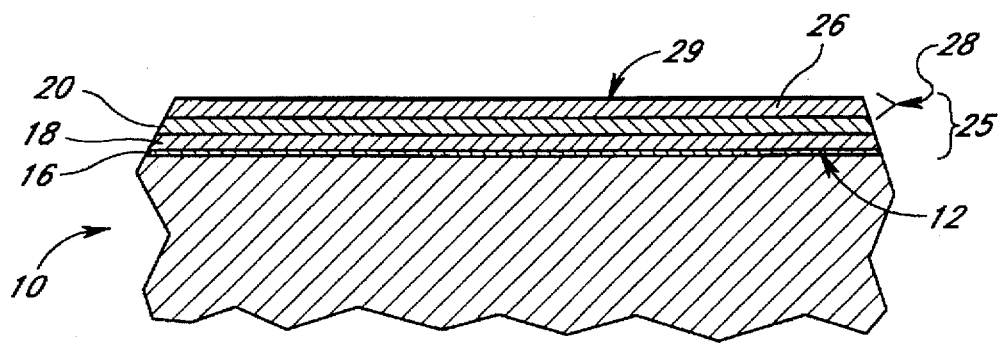
FIG. 2 is a cross-sectional view a metallic article having a protective layer formed thereon comprising two inner layers of silicate salt and an outer bi-layer.

As shown in FIG. 2, instead of converting the second layer of silicate salt 20 into a bi-layer structure 22, a third layer of silicate salt 26 can be formed over the second layer of silicate salt 20 to form a second protective layer 25 which provides greater protection than protective layer 14. In order to form the second protective layer 25, the third layer 26 is formed using the steps cited above used to form the second layer 20. Rather than exposing the second layer 20 to phosphoric acid after drying completely, it is instead exposed to the 18–33% sodium silicate solution. After the third layer of silicate salt 26 is then formed which is then exposed to 20–25% phosphoric acid to form an outer bi-layer 28. Like bi-layer 22, bi-layer 28 comprises the lower portion of the third layer 26 made of sodium silicate and an outer layer of silicon dioxide 29.

When the entire process is completed, relatively smooth, hard protective layers 14 and 25 may be formed on the surface of the article 10, comprising one or two inner layers of silicate salt 18 and 20, covered by outer bi-layers 22 or 28, respectively. The protective layers 14 and 25 are very resistant to abrasion and corrosion caused by acidic, alkaline, and salt water action, and are glass-like in appearance. These layers can be covered with organic compositions, such as paints, varnishes, and the like.

It has been discovered that cracks or pores may be formed on the top surface of each inner layer of sodium silicate 18, 20 by using the foregoing method. This may affect the overall functioning of the protective layers 14 and 25. Such cracks or pores may be in part due to the thermodynamic properties of the underlying materials being treated. One way of overcoming this problem is discussed below with regard to drying a silicate-containing solution at different initial and final temperatures and for differing amounts of time. Another way of dealing with this problem is to expose each lower layer of silicate salt 18 or 20 to an acid before forming a subsequent layer of silicate salt thereover. In this way a plurality of bi-layers may be formed over the fixed surface 12.

Figure 3:
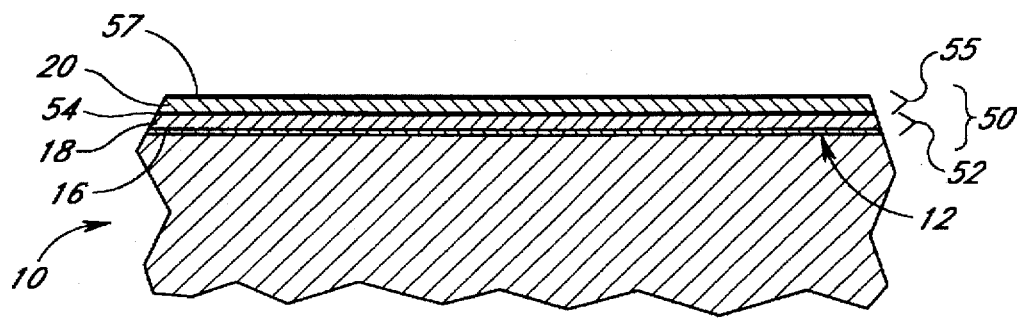
FIG. 3 is a cross-sectional view of a metallic article having a protective layer formed thereon comprising two bi-layers.

FIG. 3 shows a third protective layer 50 formed on the exposed surface of article 10 comprising two bi-layers 52 and 55 formed over the fixed surface 12 of article 10. Using the steps cited above to form protective layers 14 and 25, the two bi-layers 52 and 55 are manufactured over the fixed surface 12. Film layer 16 is first formed over the fixed surface 12. An inner bi-layer 52 comprising a first layer of silicate salt 18 and first layer of silicon dioxide 54 is then formed over the fixed surface 12. After the inner bi-layer 52 is formed, an outer bi-layer 55 is formed thereover comprising a second layer of silicate salt 20 and an outer layer of silicon dioxide 57. For some applications, however, where additional protection is needed, an additional bi-layer (not shown) may be formed over the fixed surface 12.

To form protective layer 50 over the article 10, the fixed surface 12, film layer 16 and first layer of silicate salt 18 are first formed on the article 10 using the process cited above. After the first layer 18 has dried completely and partially been converted into silicon dioxide, it is then immersed in phosphoric acid heated to between about 120° F. and 140° F. for about 15 to 30 seconds in order to form an inner layer of silicon dioxide 54. The inner layer 54 is similar to the outer layer 24 created when forming the protective layer 14. After cooling, the inner bi-layer 52 is then exposed to an 18–33% (v/v) sodium silicate solution for about one to three minutes and dried to form a second layer of sodium silicate 20 thereover. The second layer 20 is then immersed in hot phosphoric acid as above for about 15 to 30 seconds to form the outer layer of silicon dioxide 57 thereover. When the process is completed, the inner and outer bi-layers 52 and 55, respectively, are formed over the article 10.

Figure 4:
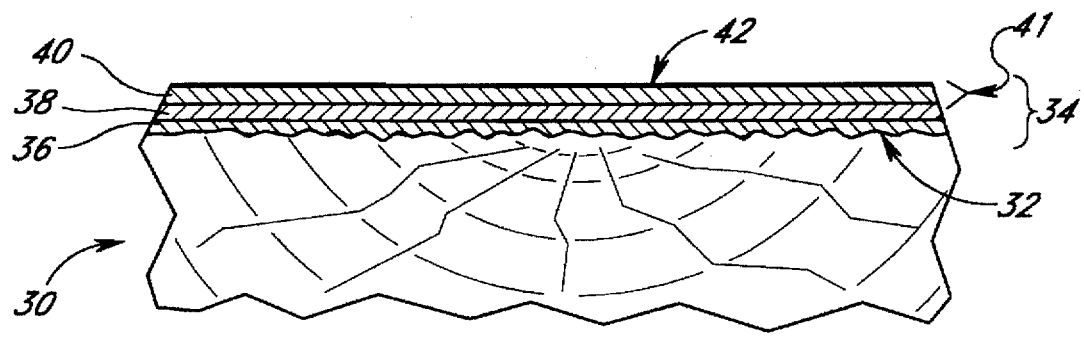
FIG. 4 is a cross-sectional view of a wood article having a protective layer formed thereon comprising two inner layers of silicate salt and an outer bi-layer.

This embodiment of the present method can also be used on various wood surfaces to provide protection against abrasion, corrosion, heat and fire. As seen in FIG. 4, in an alternative embodiment, a protective layer 34 can be formed on the exposed surfaces of an article 30 made of wood. As with metallic articles, in this embodiment a fixed surface 32 should first be formed on the article 30 so that the protective layer 34 will properly adhere to the article 30. The fixed surface 32 is formed by washing and rinsing it with hot or warm water and a detergent for several minutes to remove all dirt particles or foreign substances from the wood pores. Since wood is more porous than most metallic substances, washing the wood surface removing foreign substances is more important than with metallic surfaces. Unlike the process used on metallic surfaces, no acid is used to create the fixed surface 32.

After the fixed surface 32 has been prepared, it is then exposed to a silicate-containing solution as described above. In a preferred embodiment, the fixed surface 32 is exposed to an 18–33% (v/v) solution of sodium silicate for between about one and three minutes. During this step, the sodium silicate solution is allowed to soak into the wood pores and surface cracks to form a first layer of silicate salt 36. After exposure, the first layer of sodium silicate 36 is then dried at or near room temperature. Higher temperatures may be used, as tolerated by the wood article. It is postulated that during the exposure to the sodium silicate solution, this solution is absorbed into the wood fibers, and that as the silicate material dries it hardens and forms crystal structures between the wood fibers. It is also postulated that a small portion of the sodium silicate is converted into silicon dioxide during drying. As a result, the first layer of silicate salt 36 is relatively hard and tightly bound to the fixed surface 32. After the first layer 36 has been formed, subsequent second and third layers of silicate salt 38 and 40, respectively, are formed over the first layer 36. As when treating metallic articles according to this embodiment of the present method, it is important that the second and third layers of silicate salt 38 and 40 be dried sufficiently, in order to form a suitable amount of silicon dioxide, before proceeding with the next step.

After the third layer of silicate salt 40 has dried, it is then exposed to an acid, as in the treatment of the article 10. In a preferred embodiment, 20% to 25% (v/v) phosphoric acid is used at a temperature of 120° F.–180° F. for about 3 minutes. It is also postulated that the outer layer 40 is converted into a bi-layer 41 comprising an outer layer made of silicon dioxide 42 and the inner layer made of inner layer 40. After the outer layer of silicon dioxide 42 has dried, a hard, smooth protective layer 34 is formed over the fixed surface 32 of article 30 comprising two inner layers silicate salt 36, 38, covered by bi-layer 41.

Figure 5:
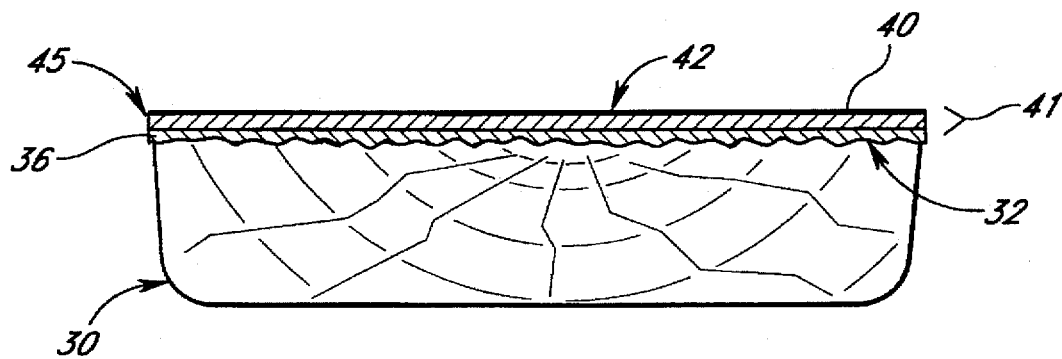
FIG. 5 is a cross-sectional view of a wood article having a protective layer formed thereon comprising an inner layer of silicate salt and an outer bi-layer.
Figure 6A:
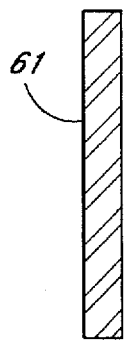
FIG. 6 is a graphic illustration of one aspect of a preferred embodiment of the present method for treating rigid articles in order to form a protective layer thereon.
Figure 6B:
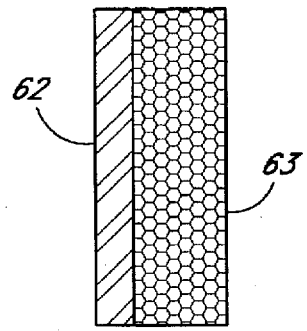
Figure 6C:
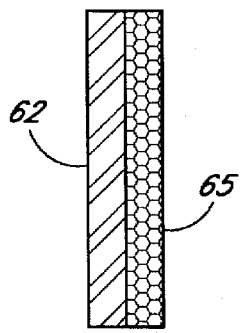
Figure 6D:
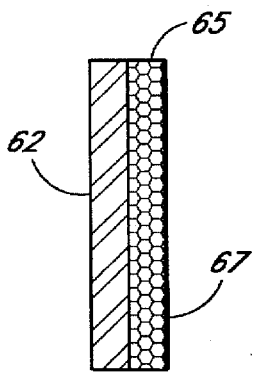

As shown in FIG. 5, for some applications it may be necessary to form an alternative protective layer 45 comprising one inner layer of silicate material 36 and one outer bi-layer 41.

The following examples are used to illustrate the methods described above.

EXAMPLE 1

A method of treating an aluminum or aluminum alloy surface using the foregoing embodiment of the present invention is described as follows:

Two samples of aluminum panels were treated—sample 1 comprised 2024 T-3 stock while a sample 2 comprised 6061 T-6 stock. Both panels measured 3 inches (W)×10 inches (L) and 0.039 inches thick. Samples 1 and 2 were first cleaned with a detergent and water and then immersed in a 25% solution of ortho-phosphoric acid at 140° F. for three minutes. The acid solution was heated to speed up the reaction and to provide a more uniform appearance. Samples 1 and 2 were then removed from the acid solution with sample 1 having a dark black smutty film and sample 2 having a light grey smutty film. The smutty films on both samples were desmutted by wiping each sample with a sponge and hot water. Once desmutted, the surface of samples 1 and 2 have a distinct silvery-white color. It is believed that this color is due to the formation of aluminum ortho-phosphate on the surface of each sample. Samples 1 and 2 were then cooled by placing them in a 60° F. water bath for one minute. While wet, the samples were then placed in a 16% sodium silicate solution for one minute. Samples 1 and 2 were then removed from the sodium silicate solution and placed in an oven heated to 300 ° to 315° F. for approximately thirty minutes to dry. After ten minutes, samples 1 and 2 were removed from the oven and allowed to cool to room temperature. It was noted that both samples 1 and 2 have a smooth, glassy surface. Once cooled, samples 1 and 2 were returned to the 18% sodium silicate solution for three minutes. Samples 1 and 2 were then placed back into the heated over for thirty minutes, then removed and allowed to cool to room temperature. When cooled, samples 1 and 2 were again placed in the 25% ortho-phosphoric acid for three minutes.

The surface of samples 1 and 2 appear hard, smooth, and glassy. The anti-corrosive properties of sample 1 and 2 were tested using ASTM B-117 or Mil. Specifications, C-5541. The paint adhesion property of samples 1 and 2 were also tested to Mil. Specifications, C-5541. Both samples 1 and 2 passed, according to the specifications for each test.

The heat and fire resistant property of each sample was tested by comparing the burning of an untreated piece of similar aluminum with the treated samples. The treated and untreated samples were exposed to an acetylene flame which burns between 2,000° F. and 2,500° F. The untreated samples decomposed to ash in approximately 30 seconds. No pooling residue was noted. The treated aluminum samples 1 and 2, on the other hand, bent after a few seconds of exposure. After approximately 2 minutes, 8 seconds, the aluminum material began slowly running out from between the two sides of the coating layer. At that point the test was then stopped. No aluminum ash residue was found.

EXAMPLE 2

A method for treating an article made of a steel or steel alloy surface using the foregoing embodiment of the present invention is as follows:

Three samples of steel panels 1–3 made of 4130 steel were treated, all measuring 4 inches (W) and 6 inches (L) and 0.041 inches thick. Samples 1–3 were first cleaned with a detergent and hot water to remove grease and oil and then immersed in 25% (by volume) solution of ortho-phosphoric acid maintained at 120° F. This step provides iron ortho-phosphate on the surfaces of the panels to which sodium silicate may bond. Samples 1–3 were then rinsed with cool water and immersed in a 33% (by volume) sodium silicate solution maintained at 40° F. The samples 1–3 were then dried at 305° F. for 30 minutes to form a first layer of sodium silicate partially converted into silicon dioxide on the exposed surfaces. Samples 1–3 were allowed to cool to room temperature and then immersed in a 25% (v/v) solution of ortho-phosphoric acid at 120° F. for approximately 15 seconds. This step forms a hard, insoluble layer of silicon dioxide over the first layer of sodium silicate, thereby creating a bi-layer structure over the surface. Samples 1–3 were then rinsed and cooled and re-immersed in the 33% of sodium silicate solution to form a second layer of sodium silicate over the exposed surfaces. Samples 1–3 were then dried at 305° F. for approximately 30 minutes and allowed to cool to room temperature. Samples 1–3 were then immersed in a 25% (v/v) ortho-phosphoric acid solution at 120° F. for approximately 15 seconds to form a bi-layer structure of sodium silicate and silicon dioxide over the samples. Samples 1–3 were then rinsed with cool water and dried at 305° F. for 5 minutes. Samples 1–3 were tested in accordance with ASTM-B117 salt spray test and passed successfully the 1/3 hour, 1 hour, 2 hour, and 24 hours tests, which indicates that the protective layer formed in the process acts as a corrosion inhibitor under standard testing conditions.

EXAMPLE 3

A method for treating copper or copper alloy surface using the foregoing embodiment of the present invention is as follows:

A sample of copper tubing was treated. The tubing measured 12 inches (L)×½ inches (I/D)×⅛ inches side thickness. The sample was first cleaned with a detergent and hot water to remove grease and oil and then immersed in the 25% (v/v) solution of ortho-phosphoric acid at 120° F. This step provides a film layer of copper ortho-phosphate on the exposed surface of the sample to which, it is postulated, sodium silicate can bond. The sample was then rinsed with cool water and immersed in 33% (by volume) sodium silicate solution maintained at 40° F. The sample was then dried at 305° F. for approximately 30 minutes to form a first layer of sodium silicate and silicon dioxide over the film layer. The sample was then allowed to cool to room temperature and then immersed in a 25% (v/v) ortho-phosphoric acid solution at 120° F. for 15 seconds. The sample was then rinsed with cool water and re-immersed in a 33% (by volume) sodium silicate solution to form a second layer of sodium silicate over the surface. The sample was then dried at 305° F. for approximately 30 minutes and allowed to cool to room temperature. The sample was then immersed in the 25% (v/v) ortho-phosphoric acid solution at 120° F. for approximately 15 seconds to form an outer layer of silicon dioxide over the second layer of sodium silicate. The sample was then rinsed with cool water and dried at 305° F. for 5 minutes. The sample was tested in accordance with ASTM-B117 salt spray test and passed successfully the 48 hour test, indicating that the protective layer formed in the process acts as a corrosion inhibitor under standard testing conditions.

EXAMPLE 4

A method of treating a wood surface using the foregoing embodiment of the present invention is described as follows:

A wood sample made of pine is first cut measuring 2 inches (W)×4 inches (L)×6 inches (H). A 20% solution of sodium silicate is then pored into a container measuring 18 inches (H)×6 inches diameter. The container has an air valve (also known as a "Shrader" valve) and a sealing lid so that pressure could be held inside the container when closed. The wood sample is then placed into the container filled with the sodium silicate solution. The container was then closed and sealed tight. An air hose was connected to the air valve and air was forced into the container to create an internal pressure of approximately 70 psi. The wood sample remained in the solution under pressure for ten minutes and then removed and allowed to dry for two hours at 90° F. When the wood sample was dry, it was returned to the sodium silicate solution and placed under pressure as described above. The wood sample was then dried for two hours at 90 degrees Fahrenheit. Once dry, the wood sample was placed into a 25% (v/v) ortho-phosphoric acid solution at 140° F. for 5 minutes. The wood sample was then removed from the acid solution and rinsed with cool tap water to wash off the excess acid. The wood was then left to dry for 2 more hours. Once dry, the sample was slightly darker in appearance. No other surface changes were visible.

The heat and flame resistance of the wood sample was tested as follows: The treated wood sample and untreated sample were exposed to an acetylene flame which burns at a temperature between 2,000° F.–2,500° F. The treated and untreated samples were exposed to the flame for one minute. Within seconds of being exposed, the untreated sample burned with a visible flame and smoke. Burning continued for approximately ten minutes. With the treated sample, combustion occurred within seconds after being exposed to the flame. After removing the flame, however, combustion stopped within three seconds, and after 15 seconds, no smoke was detected. After 30 seconds, the surface of the treated sample was slightly warm to the touch.

EXAMPLE 5

A method of treating a magnesium alloy surface using the foregoing embodiment of the present invention is described as follows:

Three samples of magnesium panels were treated—all samples were a magnesium-nickel alloy measuring 4 inches (W) ×6 inches (L)×0.041 inches thick. Samples 1–3 were first cleaned with a detergent and hot water to remove grease and oil and then immersed in a 25% (v/v) solution of ortho-phosphoric acid at 120° F. This step provides magnesium ortho-phosphate to which it is postulated the sodium silicate may bond. The samples were then rinsed with cool water and immersed in a 33% (v/v) 40° F. sodium silicate solution for 5 minutes. The samples were then dried at 305° F. for 10 minutes to form a first layer of sodium silicate. The panels were allowed to cool to room temperature and then immersed in a 25% (v/v) solution of ortho-phosphoric acid at 120° F. for 15 seconds (this step can vary from 15 to 45 seconds). A uniform, outer layer of silicon dioxide was thereby formed on the surface exposed to the acid solution. The samples were then rinsed with cool water and re-immersed in the 33% (v/v) sodium silicate solution. The samples were then dried at 305° F. for 30 minutes and allowed to cool to room temperature. The samples were then immersed in a 25% (v/v) ortho-phosphoric acid solution at 120° F. for 15 seconds, forming a final layer of silicon dioxide. The samples were then rinsed with cool water and dried at 305° F. for 5 minutes.

EXAMPLE 6

A method for treating nickel or nickel alloy surface using the foregoing embodiment of the present invention is described as follows:

A sample of nickel plated tubing was treated—the sample was nickel plated measuring 12 inches (1) c ½ inch (O.D.) and ⅛ inch side wall thickness. The sample was first cleaned with a detergent and hot water to remove grease and oil and then immersed in a 25% (v/v) solution of ortho-phosphoric acid at 120 degrees Fahrenheit. This step provides nickel ortho-phosphate to which the sodium silicate may bond. The sample was then rinsed with cool water and immersed in a 33% (v/v) 40 degree Fahrenheit sodium silicate solution for 5 minutes. The sample was then dried at 305 degrees Fahrenheit for 10 minutes to form a first layer of sodium silicate. During the drying process, a portion of the sodium silicate was partially converted into silicon dioxide. The sample was allowed to cool to temperature and immersed in a 25% (v/v) solution of ortho-phosphoric acid at 120 degrees Fahrenheit for 15 seconds (this step can vary from 15 to 45 seconds). A uniform outer layer of silicon dioxide is thereby formed on the surface exposed to the acid solution. The sample was then rinsed with cool water and re-immersed in the 33% sodium silicate solution. The sample was then dried at 305 degrees Fahrenheit for 10 minutes and allowed to cool to room temperature. The sample was then immersed in a 25% ortho-phosphoric acid solution at 70 degrees Fahrenheit for 5 minutes forming a final layer of silicon dioxide. The sample was then rinsed with cool water and dried at 305° for 5 minutes to dry.

EXAMPLE 7

A method for treating a silver or silver alloy surface using the foregoing embodiment of the present invention is described as follows:

A sample of silver plated tubing was treated. The sample measured 12 inches (L) ½ inch (O.D.) and had ⅛ inch side wall thickness. The sample was first cleaned with a detergent and hot water to remove grease and oil and then immersed in a 25% (v/v) solution of ortho-phosphoric acid at 120° F. This step provides silver nitrate on the surface of the silver, to which it is postulated the sodium silicate bonds. The sample was then rinsed with cool water and immersed in a 33% (v/v) 40° F. sodium silicate solution for 5 minutes. The sample was then dried at 305° F. for 10 minutes to form a first layer of sodium silicate. During the drying process, a portion of the sodium silicate was partially converted into silicon dioxide. The sample was allowed to cool to room temperature and then immersed in a 25% (v/v) solution of ortho-phosphoric acid at 70° F. for 5 minutes. A uniform outer layer of silicon dioxide is thereby formed on the surface exposed to the acid solution. The sample was then rinsed with cool water and re-immersed in the 33% (v/v) sodium silicate solution. The sample was then dried at 305° F. for 10 minutes and allowed to cool to room temperature. The sample was then immersed in a 25% (v/v) ortho-phosphoric acid solution at 70° F. for 5 minutes, forming a final layer of silicon dioxide. The sample was then rinsed with cool water and dried at 305° F. for 5 minutes.

EXAMPLE 8

A method for treating titanium or titanium alloy surface using the foregoing embodiment of the present invention is described as follows:

A sample of titanium plate was treated—the sample measured 3 inches (L)×3 inches (W) and 0.02 inches thick. The sample was first cleaned with a detergent and hot water to remove grease and oil and then immersed in a 10% (v/v) solution of ortho-phosphoric acid at 120° F. This step provides titanium ortho-phosphate and titanium oxide on the surface of the titanium with which it is postulated the sodium silicate may bond. The sample was then rinsed with cool water and immersed in a 33% (v/v) 40° F. sodium silicate solution for 5 minutes. The sample was then dried at 305° F. for 10 minutes to form a first layer of sodium silicate. During the drying process, a portion of the sodium silicate was partially converted into silicon dioxide. The sample was allowed to cool to room temperature and immersed in a 25% (v/v) solution of ortho-phosphoric acid at 70° F. for 5 minutes. A uniform outer layer of silicon dioxide is thereby formed on the surface exposed to the acid solution. The sample was then rinsed with cool water and re-immersed in the 33% (by volume) sodium silicate solution. The sample was then dried at 305° F. for 10 minutes and allowed to cool to room temperature. Then, the sample was immersed in a 25% (v/v) ortho-phosphoric acid solution at 70° F. for 5 minutes, forming a final layer of silicon dioxide. The sample was then rinsed with cool water and dried at 305° F. for 5 minutes.

In a preferred embodiment of the present invention, the present method can be used to treat any relatively rigid surface in order to protect the surface of that material. Metals, such as aluminum, steel, zinc, and magnesium, have been found to be particularly suited for treatment according to this embodiment. Those of skill in the art will be able to determine, through routine experimentation, those materials or surfaces which cannot be treated according to this embodiment of the invention to produce a protective layer on the surfaces of such materials. However, it is noted that materials which will degrade due to the drying temperatures employed in this embodiment of the present method or due to adverse chemical reactions with any of the chemicals or reagents, such as the silicate solution, used in this embodiment will probably not be practical to use as surfaces on which to form the protective layer according to this embodiment of the present invention.

The protective layers formed by this embodiment of the present method are somewhat flexible, and exhibit strong adhesion to the surfaces on which they are formed. The "rigid surfaces" which can be treated according to this embodiment of the present method, therefore, need only be sufficiently rigid to allow the formation of the present protective layer thereon. Surfaces made from wood, aluminum, steel, zinc, and magnesium have been found to be sufficiently rigid for these purposes. Other materials, however, can also be used. For example, a material which by itself lacks sufficient rigidity to have a protective layer formed thereon can be attached to a sufficiently rigid material and thereafter be treated according to the present method in order to form a protective layer on the surface of that material. Surfaces made rigid in this way are explicitly included in the definition of a "rigid" surface. Through routine experimentation, one of skill in the art can determine whether a particular material is sufficiently rigid by itself to undergo the present treatment or whether such a material must be supported. Such experimentation can, for example, consist of subjecting a surface made from a particular material to the present method to determine whether a protective layer can be formed thereon.

The protective layer formed according to this embodiment of the present invention is most effective when the silicate-containing solution used to form the protective layer can be applied as a uniform layer 63 to a rigid surface 61 on which it is desired to form the protective layer. In order to form such a uniform layer 63 on the rigid surface 61 in this embodiment, it is advantageous to prepare the surface 61, by either chemical or mechanical means, to provide a "wettable" or hydrophilic surface 62 on the rigid surface 61. The term "hydrophilic" as used herein describes a surface on which water and/or other liquids will form a uniform, continuous wet film or layer. A hydrophilic surface is one which will act to carry a liquid, such as water or an aqueous solution, so that when the liquid is applied to such a surface the liquid spreads evenly over the entire surface in a uniform, continuous wet film or layer. As an illustration, a waxed surface on a car on which water "beads" is not a hydrophilic surface.

Surfaces can be rendered hydrophilic by any means known to the art. The removal of excess oxides, oils, and other contaminants on a surface, such as the surface of a metal, is often sufficient to render that surface hydrophilic. Methods such as sanding, sandblasting, and using various chemical cleaners can be used to remove such oxides, oils, and other contaminants. Where the rigid surface 61 is a metal surface, the hydrophilic surface 62 can be formed by exposing that surface to an acid, preferably an acidic solution such as a solution of 20% to 25% (by volume) phosphoric acid. The phosphoric acid acts as a "chemical sandpaper" to render the surface hydrophilic. The particular method to use in order to render a rigid surface hydrophilic will depend on the characteristics of the particular surface to be treated, including its shape and the material it is made from, as will be obvious to one of skill in the art. The methods discussed above for preparing a "fixed surface" can also be employed to produce a hydrophilic surface according to this embodiment of the present invention.

By providing such a hydrophilic surface 62, a uniform, continuous film or layer 63 of a silicate-containing solution can be applied to the rigid surface 61 to be treated. It is believed, however, that methods of providing a uniform layer of the silicate-containing solution on the surface being treated other than applying the silicate solution to a hydrophilic surface can also be used to perform the present method. For example, a gel or emulsion containing a silicate material could instead be applied to a surface such that a continuous, relatively uniform layer of the gel is spread over the surface. Alternatively, the silicate solution can be sprayed on the rigid surface. The surface would then be treated as in the remaining steps of the present method.

Following the preparation of the hydrophilic surface 62 on the material to be treated, the surface 62 is preferably rinsed in order to remove impurities and/or chemical cleaning residues from the surface. Such rinsing can be accomplished by applying water, preferably at a temperature of between approximately 68° F. and 140° F., to the hydrophilic surface 62. The surface 62 can then be dried.

A silicate-containing solution is next applied to the cleaned, hydrophilic surface 62 so as to form a continuous, thin layer 63 of the solution on the hydrophilic surface 62. In a preferred embodiment, the silicate-containing solution is a sodium silicate solution, comprising silicon dioxide, silicic acid ($H_2Si_2O_5$), sodium oxide, and water (available from the PQ Corporation, Tacoma, Wash. as Liquid N or Liquid O). However, silicate-containing solutions made up of other silicate compounds can also be used. Solutions of potassium silicate, metallo-silicates (including aluminum silicate, magnesium silicate, iron silicate, copper silicate, zinc silicate, manganese silicate), an organo-silicates can be used, where potassium, other metals, or organic compounds replace the sodium in a sodium silicate solution. For example, KASIL #1, a potassium silicate solution available from the PQ Corporation, can be used in place of a sodium silicate solution. The silicate-containing solution is made up of between approximately 10% and 100% by volume of a silicate compound, such as sodium silicate or potassium silicate. Preferably, the solution contains between 20% and 40% (by volume) of the silicate compound. The solution is also preferably applied when at a temperature of between approximately 68° F. and 140° F.

The hydrophilic surface 62 is exposed to the silicate-containing solution for between approximately 1 and 60 seconds, and preferably between 1 and 20 seconds. In one embodiment, such exposure is accomplished by immersing the surface of the material being treated. Such exposure of the hydrophilic surface 62 to the silicate-containing material, however, should be minimized in order to provide the treated surface with enhanced corrosion resistance.

Once a uniform, continuous film or layer 63 of the silicate-containing solution is formed on the hydrophilic surface 62, the solution is dried. In a preferred embodiment, such drying can be accomplished by exposing the surface of the treated material to an environment having an initial temperature of between 68° F. and 480° F., and preferably having an initial temperature of between 120° F. and 150° F.

The temperature of the environment surrounding the treated hydrophilic surface is then raised by between approximately 30° F. per minute and 60° F. per minute until a final temperature of between about 302° F. and 480° F., and preferably between 305° F. and 350° F., is reached. In this way, the temperature of the silicate-containing solution and the surface underlying it is raised from a lower initial temperature to a higher temperature. In some cases, for example when a material of low thermal conductivity is used in the surface being treated, the environment surrounding the surface can be at a higher initial temperature, since the surface will itself rise in temperature slowly due to its low thermal conductivity. It is important, however, that the silicate-containing solution/dried silicate material reach a temperature of at least 302° F. during this drying step.

The drying of the layer of silicate-containing solution 63 can be accomplished, for example, by placing the treated surface in a drying oven. Other methods known to those of skill in the art are, of course, also possible. For example, infrared radiation from a heat lamp can also be used to dry the layer of the silicate-containing solution 63 and raise it to a temperature above 302° F. In addition, agents can be added to the silicate-containing solution to aid in the drying and hardening of the layer 63. Zinc oxides, when present in such a solution in an amount of up to 7% (by volume) of the solution, will assist in the hardening of the solution.

The drying time for a film or layer 63 of the silicate-containing solution on the hydrophilic surface 61 will depend in part on the thickness of the film or layer 63, the form or shape of the surface and article being treated, and the composition of the material being treated. For example, a material with a high thermal conductivity, such as aluminum, can be first exposed to a temperature at the lower end of the above-specified range of drying temperatures, after which the ambient temperature surrounding the aluminum surface can be raised. On the other hand, the present method will work best on a material with a lower thermal conductivity when that material is first exposed to a higher temperature. In most cases, an appropriate drying time will be between approximately 2 and 50 minutes, and preferably between 6 and 15 minutes.

After the silicate-containing solution has dried on the surface of the material being treated, as described above, the dried silicate layer 65 is exposed to an acid, such as an acidic solution, in order to form the protective layer according to the present invention. An acidic solution used in this embodiment can comprise between 1% and 99% (by volume) of an acid, and preferably between 10% and 30% (by volume) of such an acid. In a preferred embodiment, the acidic solution used is a phosphoric acid solution, because phosphoric acid is cheap, relatively safe, and widely available. However, other acids can also be used. For example, gaseous carbon dioxide, which is a weak acid, can be passed over or through the surface being treated. A gaseous acid such as carbon dioxide is particularly useful when the surface being treated is relatively porous, such as a wood surface.

When an acidic solution is used, the acidic solution is preferably at a temperature of between approximately 68° F. and 180° F. when applied to the dried layer of silicate material 65. Any method of applying the acidic solution to the dried silicate layer 65 known to those of skill in the art can be used. For example, if the surface to which the silicate-containing solution was applied encompasses the entire surface of an article or even just the entire surface of one member of an article, the article or member can be immersed or "dipped" in the acidic solution. Alternatively, the acidic solution can be applied to a surface that comprises only part of an article or a member of an article by spraying the acidic solution onto the article, or by any other means. The acidic solution is preferably exposed to the layer of silicate material for between about 5 seconds and 120 seconds. More preferably, the acidic solution is exposed to the layer for between 20 seconds and 50 seconds.

During the application of the acidic solution, the protective layer is formed on the surface being treated. The protective layer comprises an outer layer 67 exposed to the acid, made up of mostly silicon dioxide, and an inner layer made up of the dried silicate material 65. The dried silicate material 65 comprises both silicon dioxide and other oxides. For example, when the silicate-containing solution is sodium silicate, the dried silicate material will be made up of silicon dioxide and sodium oxide. By exposing the surface of the silicate material 64 to an acid, the oxides and other soluble contaminants are removed from the surface of the outer layer 67, leaving a non-porous outer layer 67 comprising mainly silicon dioxide. It is this outer layer 67 of silicon dioxide that is believed to impart to the protective layer the increased resistance to corrosion, abrasion, and other sources of damage to a surface. By contrast, the inner layer 65 is relatively more soluble water and other solvents.

Following the application of the acidic solution to the dried silicate material 65, the surface being treated is can be rinsed to remove excess acidic solution. Such rinsing can be accomplished by applying water, preferably at a temperature of between approximately 68° F. and 140° F., to the treated surface. Water can be applied to the surface either by spraying or by immersion in water or by any other means. The surface is then allowed to dry.

If desired, the foregoing steps of applying a silicate-containing solution, drying the solution on the surface of a material, and then exposing the dried silicate material to an acid can be repeated a plurality of times. In this aspect of the present embodiment, each protective layer should be rinsed after the formation of the protective layer in order to remove excess acid before next applying a new layer of the silicate-containing solution. By repeating these steps, a plurality of protective layers can be formed on a surface. By forming a plurality of protective layers, the protective properties of the protective layer can be enhanced. For example, the corrosion resistance of a piece of metal on which the protective layer of the present invention has been formed can be increased by increasing the number of protective layers on that piece of metal.

EXAMPLE 9

A Method of Treating an Aluminum Surface

Two samples of aluminum panels are treated—sample 1 comprises 2024 T-3 stock while sample 2 comprises 6061 T-6 stock. Both panels measure 3 inches (W)×10 inches (L) and 0.039 inches thick. The surfaces of Samples 1 and 2 are provided with hydrophilic surfaces by wet sanding the surfaces of the panels with an electric hand sander for 5 minutes. These hydrophilic surfaces are then rinsed with a detergent and water. While wet, the samples are immersed in a 16% (by volume) sodium silicate solution for 20 seconds at approximately room temperature in order to coat the panels with a uniform layer of the sodium silicate solution. Samples 1 and 2 are then removed from the sodium silicate solution and placed in an oven heated initially to about 130° F. The temperature of the oven is then raised by about 40° F. per minute until a temperature of 310° F. is reached. The coated panels remain in the oven for about 12 minutes altogether. After 12 minutes, samples 1 and 2 are removed from the oven and allowed to cool to about 100° F. Once cooled, samples 1 and 2 are immersed in a 25% (by volume) ortho-phosphoric acid solution for 40 seconds. Following this, the surfaces of samples 1 and 2 are rinsed to remove excess ortho-phosphoric acid solution.

The surface of samples 1 and 2 appear hard, smooth, and glassy. The anti-corrosive properties of sample 1 and 2 are tested using ASTM B-117 and Mil. Specifications, C-5541. These samples are subjected to such tests for 168 and 336 hours, and are found to exceed the standards specified by these tests. The paint adhesion properties of samples 1 and 2 are also tested to Mil. Specifications, C-5541. Both samples 1 and 2 pass, according to the specifications for each test.

The heat and fire resistant properties of each sample are tested by comparing the burning of an untreated piece of similar aluminum with the treated samples. The treated and untreated samples are exposed to an acetylene flame which burns between 2,000 and 2,500 degrees Fahrenheit. The untreated samples decompose to ash in approximately 30 seconds. The treated aluminum samples 1 and 2, on the other hand, bend after a few seconds of exposure. After approximately 2 minutes, the aluminum material begins slowly running out from between the two sides of the coating layer.

EXAMPLE 10

A Method for Treating a Steel Surface

Three samples of steel panels 1–3 made of 4130 steel are treated, all measuring 4 inches (W) and 6 inches (L) and 0.041 inches thick. The surfaces of Samples 1–3 are provided with hydrophilic surfaces by wet sanding the surfaces of the panels with an electric hand sander for 5 minutes each. These hydrophilic surfaces are then rinsed with a detergent and water. While wet, the samples are immersed in a 16% (by volume) sodium silicate solution for 20 seconds at approximately room temperature in order to coat the panels with a uniform layer of the sodium silicate solution. Samples 1–3 were then placed in an oven at 310° F. for 12 minutes. After 12 minutes, samples 1–3 are removed from the oven and allowed to cool to about 100° F. Once cooled, samples 1–3 are immersed in a 25% (by volume) phosphoric acid solution for 40 seconds. Following this, the surfaces of samples 1–3 are rinsed to remove excess phosphoric acid solution.

Samples 1–3 were tested in accordance with ASTM-B117 salt spray test and passed successfully the ⅓ hour, 1 hour, 2, 24, 48, and 96 hours tests, which indicates that the protective layer formed in the process acts as a corrosion inhibitor under standard testing conditions.

Although the present invention has been described in terms of certain preferred embodiments, other embodiments and alternatives known to those of skill in the art are also hereby included. Therefore, the embodiments described herein are merely examples of the present invention and are not meant to limit its scope.

We claim:

1. A method for treating a rigid surface of an article in order to form a protective layer on said rigid surface, comprising the steps of:
   (a) forming a hydrophilic surface on said rigid surface of said article;
   (b) applying a silicate-containing solution to said hydrophilic surface, thereby forming a continuous layer of said silicate-containing solution on said hydrophilic surface;

(c) drying said layer of silicate-containing solution on said hydrophilic surface to produce a dried layer of silicate material on said rigid surface of said article; and (d) exposing said dried layer of silicate material to an acid, thereby forming said protective layer on said rigid surface.

2. The method of claim 1, wherein said hydrophilic surface is created by mechanical means.

3. The method of claim 2, wherein said mechanical means comprises sanding said surface.

4. The method of claim 1, wherein said hydrophilic surface is created by chemical means.

5. The method of claim 1, additionally comprising the step of rinsing said hydrophilic surface before said hydrophilic surface is exposed to said silicate-containing solution.

6. The method of claim 1, wherein said silicate-containing solution contains between 10% and 100% (by volume) of a silicate compound.

7. The method of claim 6, wherein said silicate-containing solution contains between 20% and 40% (by volume) of said silicate compound.

8. The method of claim 1, wherein said silicate-containing solution is a sodium silicate solution.

9. The method of claim 1, wherein said silicate-containing solution is a potassium silicate solution.

10. The method of claim 1, wherein said hydrophilic surface is exposed to said silicate-containing solution during the step of applying said silicate-containing solution for between 1 and 60 seconds in order to form said layer of silicate-containing solution.

11. The method of claim 10, wherein said hydrophilic surface is exposed to said silicate-containing solution for 20 seconds or less in order to form said layer of silicate-containing solution.

12. The method of claim 1, wherein said drying step comprises heating said layer of silicate-containing solution on said hydrophilic surface.

13. The method of claim 12, wherein said layer of silicate-containing solution is heated to at least 302° F.

14. The method of claim 13, wherein said heating comprises exposing said layer of silicate-containing solution on said hydrophilic surface to an environment having an initial temperature of between about 68° F. and 480° F. and then raising the temperature of said environment at a rate of between about 30° F. and 60° F. per minute until a temperature of between 302° F. and 480° F. is reached.

15. The method of claim 14, wherein said heating comprises exposing said layer of silicate-containing solution on said hydrophilic surface to said environment having an initial temperature of between 120° F. and 150° F. and then raising the temperature of said environment at a rate of between about 30° F. and 60° F. per minute until a temperature of between 305° F. and 350° F. is reached.

16. The method of claim 1, wherein said drying step lasts for between about 2 minutes and 50 minutes.

17. The method of claim 16, wherein said drying step lasts for between 6 minutes and 15 minutes.

18. The method of claim 1, wherein said acid is an acidic solution which contains between 1% and 99% by volume of an acid.

19. The method of claim 18, wherein said acidic solution contains between 10% and 30% by volume of said acid.

20. The method of claim 19, wherein said acid is phosphoric acid.

21. The method of claim 1, wherein said dried layer of silicate material is exposed to said acidic solution for between about 5 seconds and 120 seconds.

22. The method of claim 21, wherein said dried layer of silicate material is exposed to said acidic solution for between 20 seconds and 50 seconds.

23. The method of claim 1, wherein said acid is an acidic solution which is between 68° F. and 180° F. when said dried layer of silicate material is exposed to said acidic solution.

24. The method of claim 1, wherein steps (b) to (d) are repeated a plurality of times.

25. The method of claim 1, wherein said protective layer is rinsed to remove excess acid.

26. A method for treating an article having a rigid surface in order to form a protective layer on said rigid surface, comprising the steps of:

(a) providing a continuous layer of a silicate-containing solution to said rigid surface of said article;

(b) drying said uniform layer of said silicate-containing solution to produce a dried layer of silicate material on said rigid surface; and (c) exposing said solid layer of silicate material to an acid, thereby forming a protective layer on said rigid surface.

27. The method of claim 26, additionally comprising the step of providing a hydrophilic surface on said rigid surface before applying said uniform layer of said silicate-containing solution to said rigid surface.

* * * * *